No. 836,105. PATENTED NOV. 20, 1906.
C. C. FARMER.
LOAD BRAKE APPARATUS.
APPLICATION FILED FEB. 17, 1904.
8 SHEETS—SHEET 2.
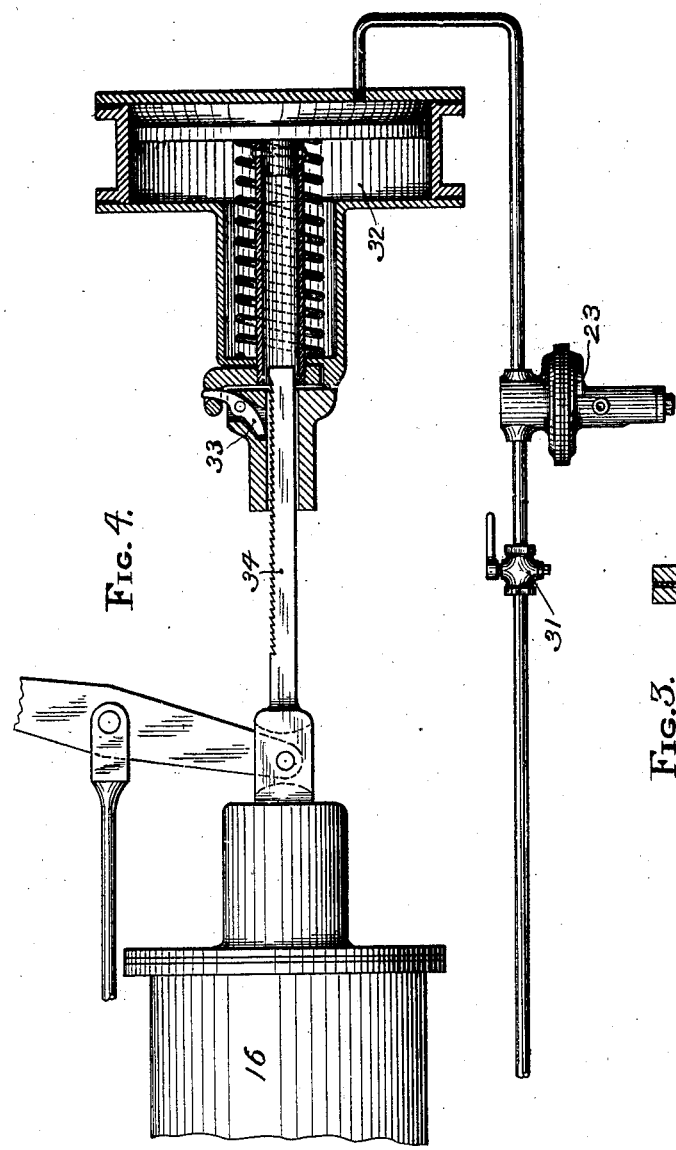
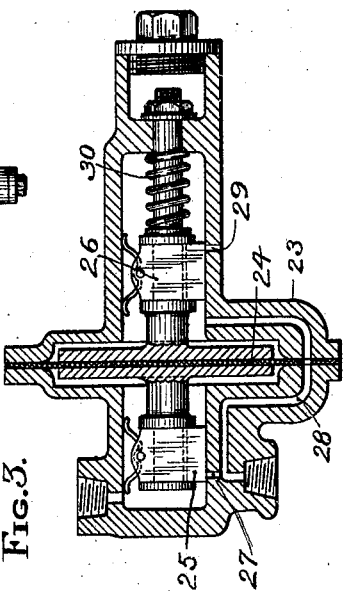
WITNESSES:
INVENTOR:
Clyde C. Farmer
BY
ATTORNEY No. 836,105. PATENTED NOV. 20, 1906.
C. C. FARMER.
LOAD BRAKE APPARATUS.
APPLICATION FILED FEB. 17, 1904.

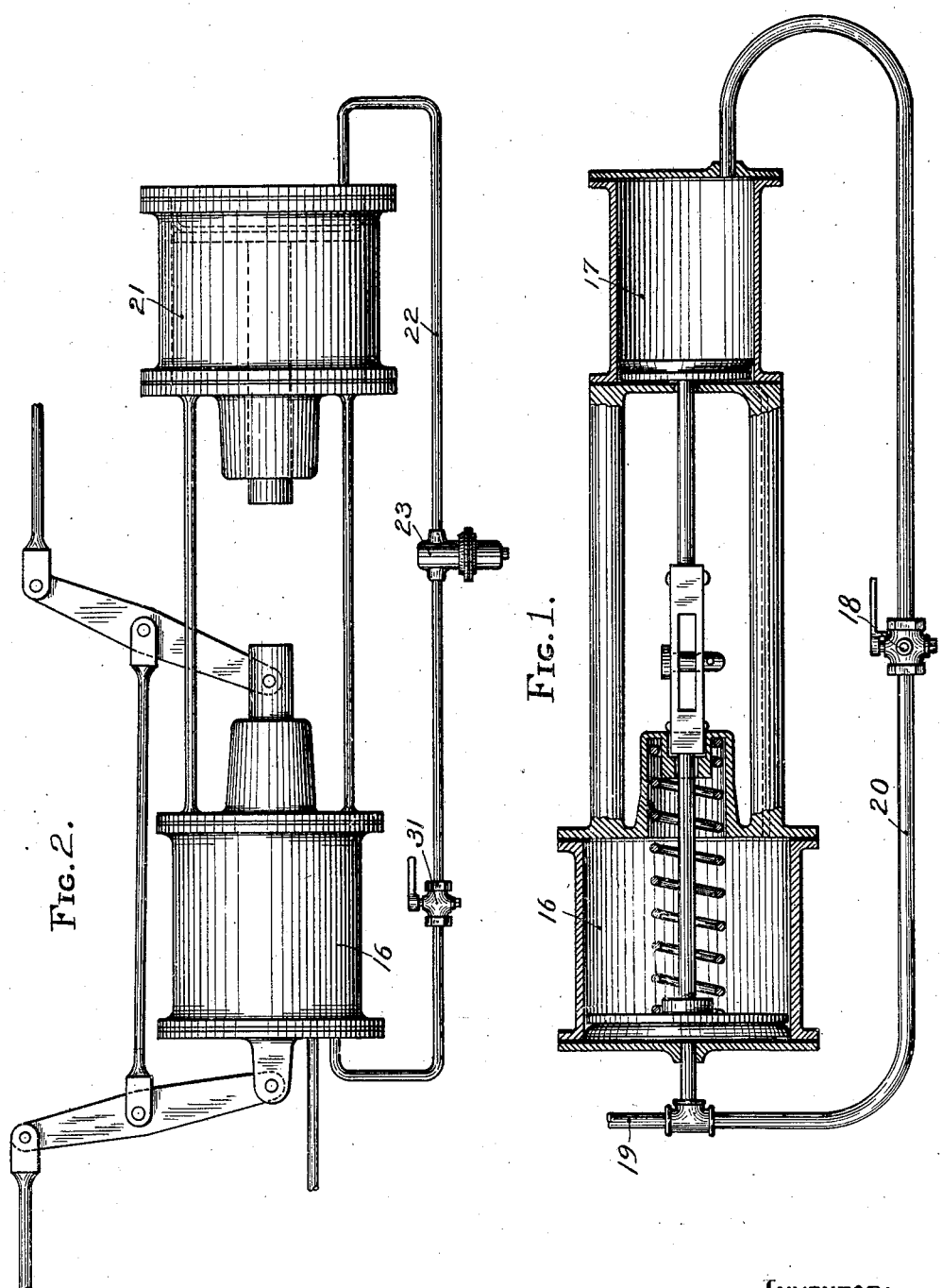

WITNESSES:

INVENTOR:
Clyde C. Farmer
BY
Paul Synnestvedt
ATTORNEY.

No. 836,105. PATENTED NOV. 20, 1906.
C. C. FARMER.
LOAD BRAKE APPARATUS.
APPLICATION FILED FEB. 17, 1904.
8 SHEETS—SHEET 4.
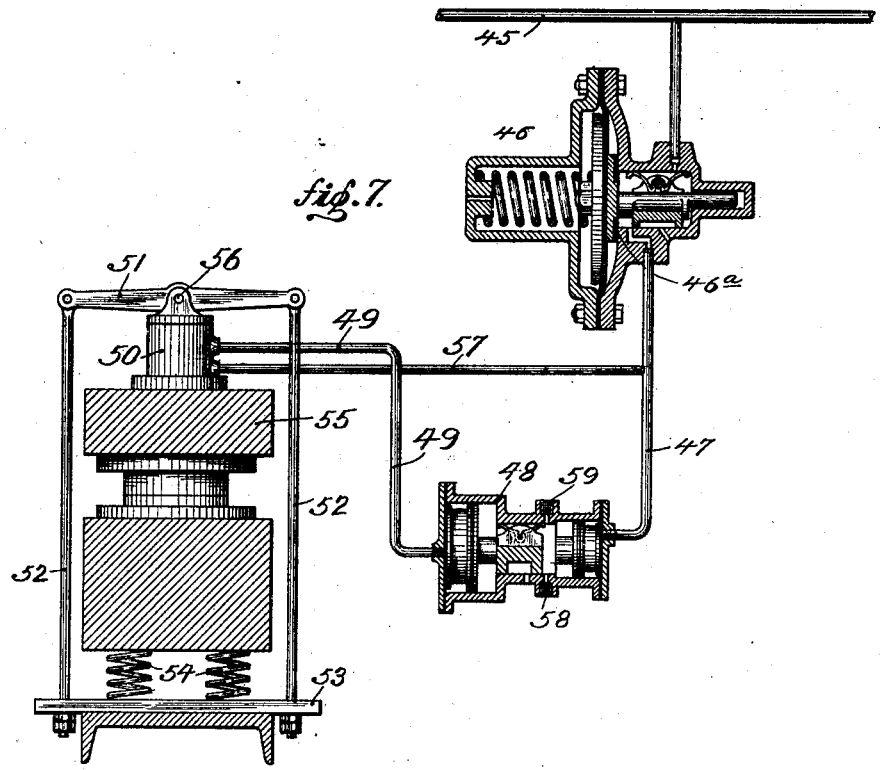
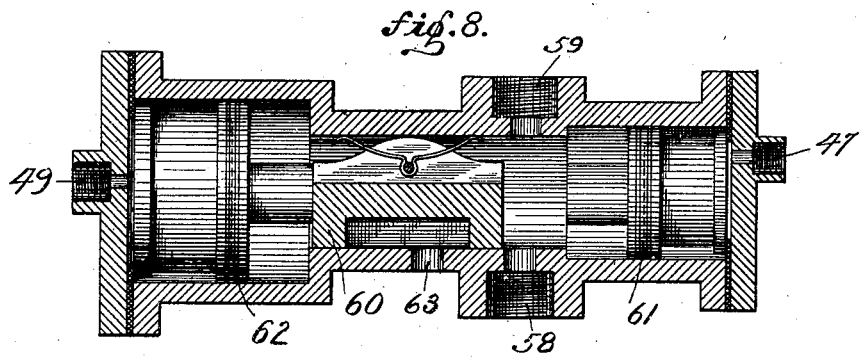
WITNESSES:
INVENTOR,
Clyde C. Farmer
BY Paul Synnestvedt
ATTORNEY.

No. 836,105. PATENTED NOV. 20, 1906.
C. C. FARMER.
LOAD BRAKE APPARATUS.
APPLICATION FILED FEB. 17, 1904.
8 SHEETS—SHEET 5.
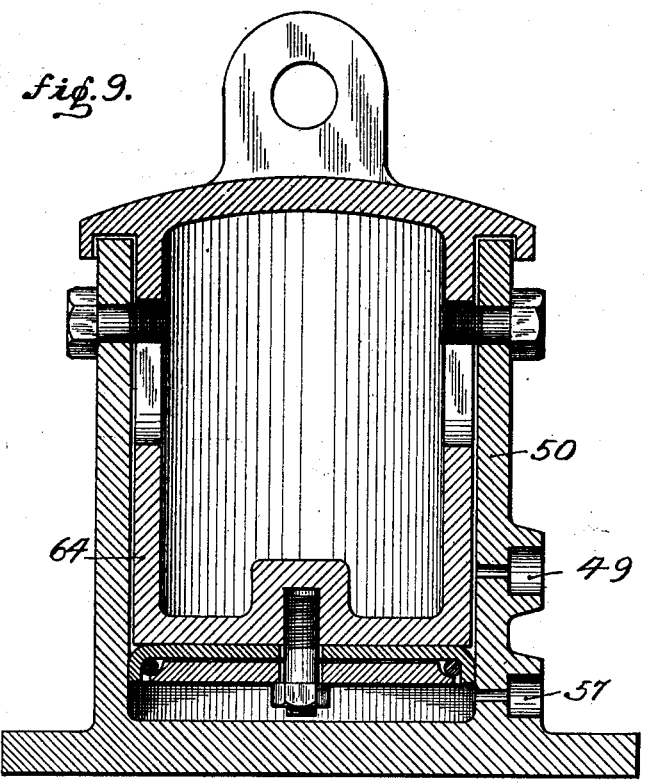
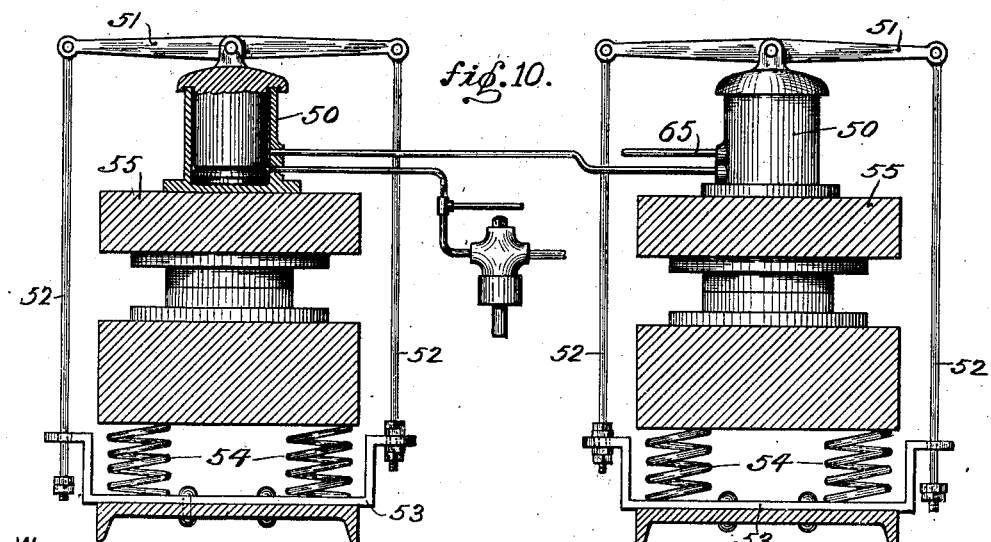
WITNESSES:
INVENTOR,
BY
ATTORNEY.

No. 836,105. PATENTED NOV. 20, 1906.
C. C. FARMER.
LOAD BRAKE APPARATUS.
APPLICATION FILED FEB. 17, 1904.

WITNESSES:
INVENTOR,
Clyde C. Farmer
BY
Paul Synnestvedt
ATTORNEY.

No. 836,105. PATENTED NOV. 20, 1906.
C. C. FARMER.
LOAD BRAKE APPARATUS.
APPLICATION FILED FEB. 17, 1904.
8 SHEETS—SHEET 7.
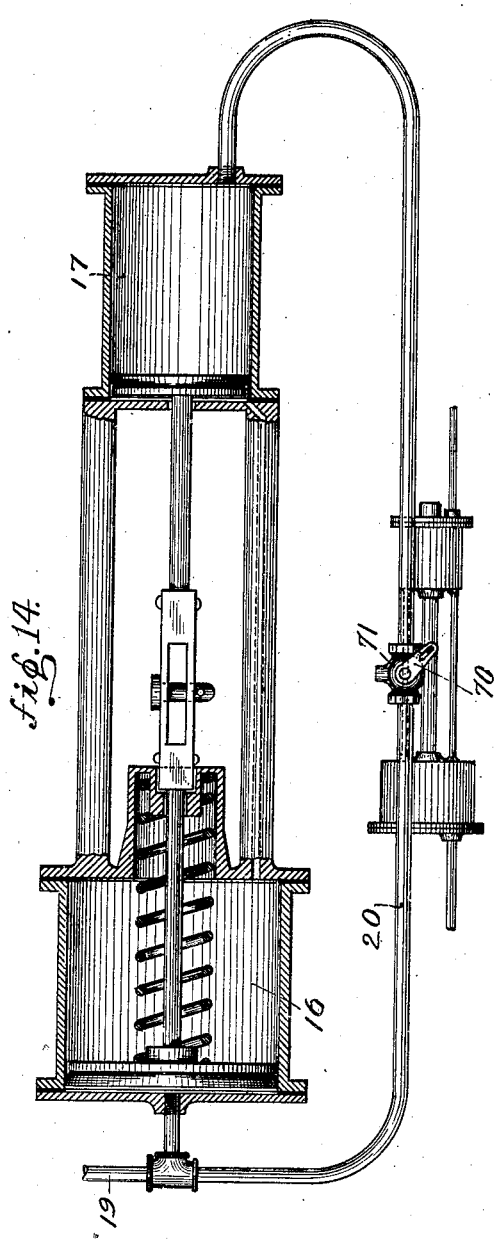
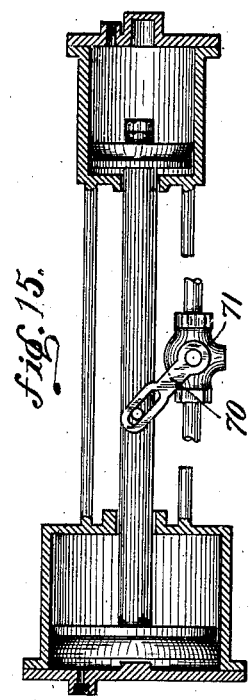
WITNESSES:
INVENTOR,
Clyde C. Farmer
BY Paul Synnestvedt
ATTORNEY.

No. 836,105. PATENTED NOV. 20, 1906.
C. C. FARMER.
LOAD BRAKE APPARATUS.
APPLICATION FILED FEB. 17, 1904.

WITNESSES:
F. E. Gaither
Archwrth Martin

INVENTOR,
Clyde C. Farmer
BY Paul Synnestvedt
ATTORNEY.

UNITED STATES PATENT OFFICE.

CLYDE C. FARMER, OF CHICAGO, ILLINOIS, ASSIGNOR TO WESTINGHOUSE AIR BRAKE COMPANY, OF WILMERDING, PENNSYLVANIA, A CORPORATION OF PENNSYLVANIA.

LOAD-BRAKE APPARATUS.

No. 836,105.  Specification of Letters Patent.  Patented Nov. 20, 1906.

Application filed February 17, 1904. Serial No. 194,109.

*To all whom it may concern:*

Be it known that I, CLYDE C. FARMER, a citizen of the United States, residing at Chicago, in the State of Illinois, have invented certain new and useful Improvements in Load-Brake Apparatus, of which the following is a specification.

This invention has reference to the provision of improved load brake apparatus for use in air brake service such as will automatically cut in or cut out the load brake mechanism according to the condition of the car, that is, whether light or loaded, and which will operate said load brake mechanism automatically through means applied so as to be actuated by the compression of the springs supporting the weight of the car, and which will automatically compensate for any permanent set that the springs supporting the car may have, or for any other irregularity in practical conditions of service which might tend to throw the mechanism out of proper condition.

Further objects of the invention have reference to the provision of means whereby the load brake mechanism cannot be brought into operation unless both ends of the car are loaded, and whereby the entire load brake device will be cut out automatically when the train pipe pressure reaches a certain predetermined point.

The above as well as such other objects as may hereinafter appear, I attain by means of a construction which I have illustrated in preferred form in the accompanying drawings, in which—

Figure 1 is a sectional view showing one form of my improvement, with a hand actuated three-way cock for cutting in or out what I call an "opposing" cylinder, whereby to secure the desired braking effect on the load brake according to the weight or load upon the car;

Figure 2 is a view of a regular braking cylinder with another opposing cylinder of the same diameter as the braking cylinder, but with a differential reducing valve introduced, so as to oppose a less pressure than the braking cylinder exerts;

Figure 3 shows the construction which I employ for the said special reducing or differential pressure valve, indicated in Figure 2;

Figure 4 is an arrangement wherein cylinders of the same diameter are employed with the differential pressure or reducing valve, but where the opposing cylinder is very short and there is a rack and pawl arrangement employed to dispense with the necessity for using a long stroke of the piston of the opposing cylinder;

Figure 7 shows a section through a car bolster and some of its connected parts indicating the springs below the bolster and some mechanism employed by me as automatic means for actuating the load brake device;

Figure 8 is an enlarged sectional view of the change valve device shown in Figure 7;

Figure 9 is an enlarged sectional view of the controlling piston device actuated by the yoke and lever arrangement shown in Figure 7 for controlling the admission of fluid pressure to the left side of the change valve;

Figure 10 shows the application of my improvement to both ends of the car whereby the load brake mechanism cannot be brought into action unless both ends of the car are loaded;

Figure 14 is a view, partly in section, showing a differential opposing cylinder arrangement similar to that shown in Figure 1, but with the three-way cock for controlling the operation of the same, that is the change valve, actuated automatically by means of the mechanism shown in section in Figure 15.

Figure 6:
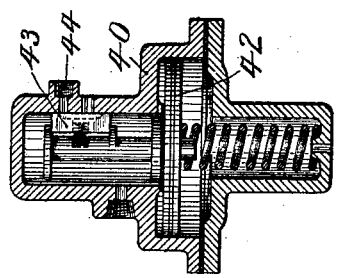
Figure 6 is a sectional view of the valve used in conjunction with the apparatus of Figure 5 to cause the actuation of the locking mechanism at a reduced pressure.

Referring now more particularly to Figure 1 it will be seen that I have therein provided a braking cylinder 16 of the usual type but having connected therewith what I term an "opposing" cylinder 17, which in this case is of smaller diameter and acting in opposition to the braking cylinder 16 whenever the three-way cock 18 or change valve, which in this case is a hand actuated mechanism, shall be open so as to establish communication between the two cylinders. It will be obvious, by examining this arrangement, that when the air pressure which applies the brake enters through the pipe 19 it will first flow into the cylinder 16 and move the piston out, and then around through the pipe 20 to the opposing cylinder 17 and oppose the motion of the cylinder 16 if the cock 18 be open and the proportion of the areas between the two cylinders 16 and 17 will determine substantially the amount of pressure applied to the brake levers through the piston rod. If the car is light the cock 18 is to be placed in open position, that is to establish communication between the two cylinders which will reduce the braking force to the pre-determined degree required; while if the car is loaded the cock 18 is intended to be closed, that is to cut off communication from the cylinder 16 to the cylinder 17 and to open the cylinder 17 to the atmosphere, so as to allow any pressure that may be therein to escape; this allows the full force of the piston in the cylinder 16 to be exerted on the brake levers, which can be proportioned to give the requisite degree of braking force on the loaded car.

Referring now to Figure 2, it will be seen that I have shown a similar arrangement, but one in which the cylinders are of the same size, the braking cylinder 16 being at the left and the opposing cylinder, which in this case is marked 21, being at the right and of the same diameter as the cylinder 16 but connected by a pipe 22 in which is located a special form of reducing valve 23, shown in section in Figure 3, the said reducing valve keeping down the pressure in the cylinder 21 so that it will not oppose more than a proportion of the force that is exerted by the cylinder 16. Of course there will be no air in the second cylinder at all, with this arrangement, until after the valve 23 shall have opened, admitting the pressure at a reduced amount to the cylinder 21.

Referring to Figure 3 the construction of the differential reducing valve will be seen. It embodies in substance a piston or movable abutment 24 operating slide valves 25 and 26, the former whereof 25 controls a port 27 which leads to the second cylinder or opposing cylinder, and also around through the passage 28 to the opposite side of the abutment adjacent to the slide valve 26. The slide valve 26 controls an opening 29 leading to the atmosphere, which, when the spring 30 moves the piston to the left, as it will when the pressure has equalized through the passage 28, will allow the escape of the pressure on the right side of the piston 24 or movable abutment. With this arrangement, when the pressure in the first cylinder becomes great enough to move the slide valve 25 over so as to open the port 27 air will pass to the opposing cylinder and from thence will exert opposing pressure to the braking cylinder as in the case of the light car, preventing the accumulation of an excessive braking force. In order to cut this device into and out of action there is provided a cock indicated at 31 on Figure 2.

Figure 4 shows a similar arrangement to that shown in Figure 2 but with the added feature of a short stroke opposing cylinder marked 32, which is arranged by means of a pawl 33 to engage with the rack 34 after the braking cylinder has moved the rack out and thus opposed the further braking force of the braking cylinder without requiring a long piston travel, and therefore without utilizing much of the air. It is obvious that the rack 24 will be moved out before any movement will take place of the pawl 33 because the valve 23 being a reducing valve will not admit pressure to the cylinder 32 until after the braking cylinder 16 will have acquired considerable air pressure.

Figure 5:
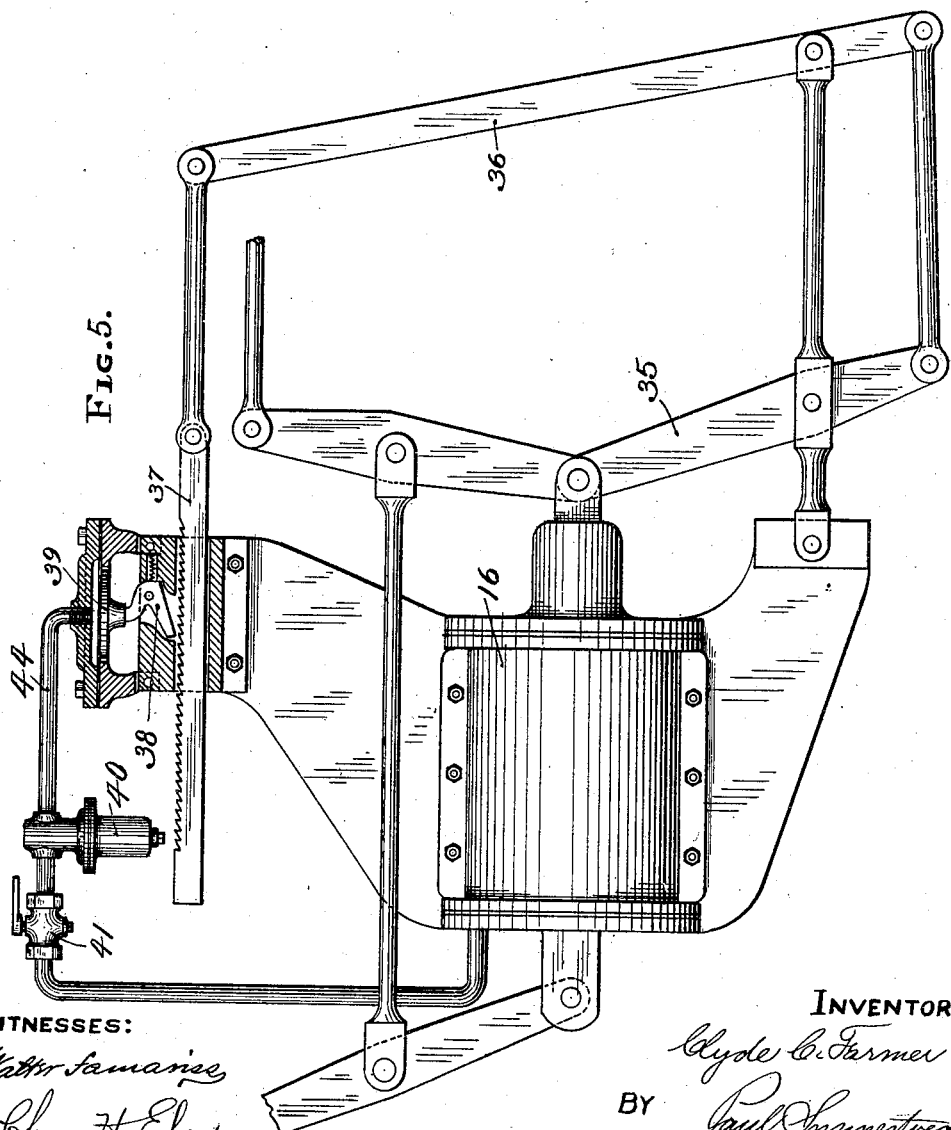
Figure 5 shows another arrangement of a device in which an opposing pressure is used due to a locking contrivance which takes the place of the opposing cylinder of the other figures, the said locking contrivance being actuated by fluid pressure in a manner which will hereinafter be more particularly described.

In order to show that an opposing mechanism, similar to my opposing cylinder, can be used in which levers or other similar contrivances are substituted for the opposing cylinder fluid actuated, I have shown in Figure 5 a lever or mechanical device in which the braking cylinder 16 is opposed by means of the lever mechanism comprising levers 35 and 36 and the rack bar 37, and fluid actuated pawl 38, which has its motion from the movable abutment 39, which in turn is controlled through the valve device 40 and the cut out cock 41.

The device 40 is shown in section in Figure 6, and comprises the piston 42 actuating a slide valve 43 that controls the admission and exhaust of pressure from the pipe 44 leading to the chamber above the abutment 39. When pressure from the cylinder 16 is allowed to pass the valve 41 and is sufficient in amount to pass the reducing valve 40 it will be admitted to the upper side of the abutment 39 and will move the same down thus blocking the brake lever 35 and opposing any further outward movement of the piston in the cylinder 16, such as would result from an accumulation or augmentation of pressure therein. This mechanically locks the piston of the cylinder 16 against further movement and takes the place of the opposing mechanism of the fluid pressure cylinders described in connection with the preceding figures.

Referring now to Figure 7 and 8, it will be seen that I have therein shown mechanism whereby I aim to control automatically the operation of the change valve or device which serves to cut in or out the load brake apparatus. In Figure 7, 45 represents a train pipe and 46 represents a controlling valve which operates to cut off the train pipe when the pressure reaches say 30 pounds, but up till that point admits air from the train pipe to the pipe 47 from whence it passes to the right side of the change valve 48 shown in large size in Figure 8, the left side whereof receives pressure through a pipe 49 from a controlling piston device 50 which has its actuation from a lever 51 connected by the rod 52 with a cross piece 53 below the springs 54 as shown. In the controlling valve 46 the spring is set at a pressure which will permit the diaphragm to move when there is say 30 pounds in the train pipe exerted against the seat 46ᵃ as soon as the slide valve begins to move the full area of the diaphragm or movable abutment is available to move it clear over and hold it until the pressure in the train pipe has fallen to just a little above the pressure of the atmosphere when the spring will move the parts back. It will be obvious that when weight is on the car the beam 55 will be forced downward by the compression of the spring 54 and this will allow slack in the connecting rods 52 and permit the piston which has its cross head 56 attached at the middle of the lever 51 to move upward under the force of the pressure entering through the pipe 57. If the upward movement is sufficient to uncover the pipe 49 then air pressure, which has entered from the train pipe through the valve 46, will pass through the pipe 49 to the left side of the change valve and move the device thereof to the right, cutting out the opening 58 that leads to the opposing cylinder and allowing the main brake cylinder 16, to exert its full force. If the car is light, the pipe 49 will not be opened by the piston in the device 50 and therefore the pressure in 47 will pass only to the right side of the change valve and will hold it in the position shown in Figure 7, in which air can enter the opposing cylinder through the opening 58 from the main brake cylinder 16, which is connected to the change valve at the point 59.

The change valve 48 is in shape of the slide valve 60 as shown in Figure 8 actuated by means of the pistons 61 and 62 in the manner already described, and the casing of the change valve is provided with an exhaust port at 63 for exhausting the pressure from the opposing cylinder when the slide valve is in the right hand position, as will be evident from examination of the figure given in the drawing.

A detail view on a larger scale of the piston control device 50 is shown in Figure 9 with the inlet opening 57 and the outlet opening 49 clearly shown, and the relative position of the piston 64 with reference to said opening. In Figure 10 I have shown a similar device applied at both ends, the air being intended to pass first one end, indicated at the left, and then from that controlling piston device to the one on the right hand end before entering the pipe 65 which is intended to be connected to the left side of the change valve 48 indicated on Figure 7. By the arrangement shown in Figure 10, it is thus clear that the load brake force or the maximum power of the brake cannot be brought into action unless both ends of the car are loaded.

Figure 11:
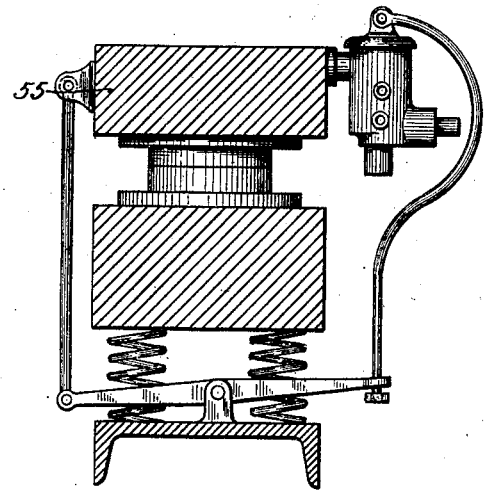
Figure 11 shows a slightly different location of the controlling piston device, that is it is placed on the side of the beam instead of on top, as in Figure 7.
Figure 16:
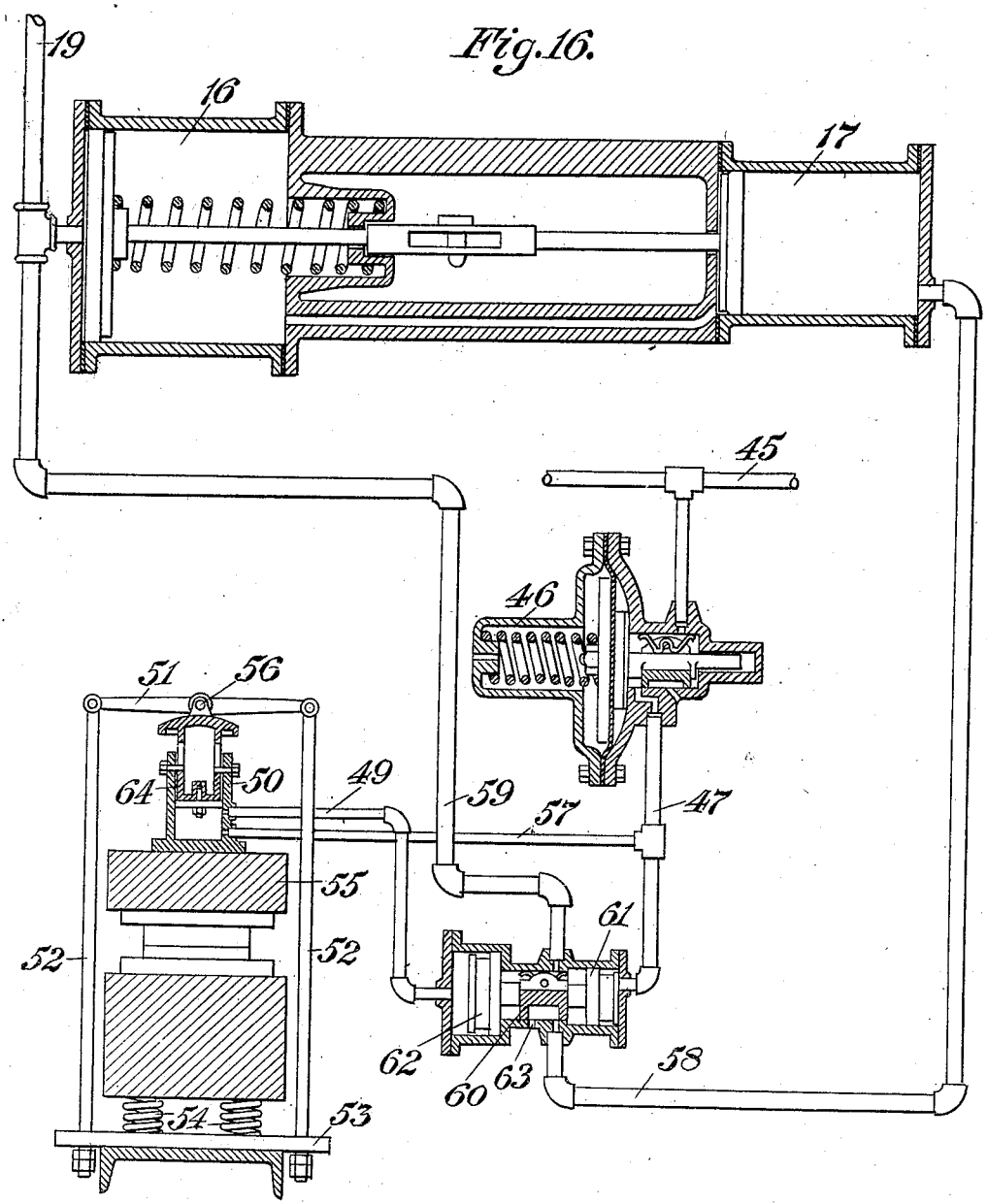
Figure 16 is a diagrammatic view showing the arrangement of the complete system.

Referring to Figure 11 it will be seen that I have therein shown a piston controlling device similar to that shown on Figure 7, but with the lever slightly altered in arrangement, the cylinder and the piston being at one side of the timber 55 but operating in all respects substantially as in the case of the mechanism of Figure 7.

In Figure 14 I have indicated a differential piston arrangement similar to the differential pistons of the change valve of Figures 7 and 8, the same being connected by means of the lever 70 with the three-way cock 71, so as to actuate the same in substantially an equivalent way to that shown in Figure 8.

The operation of the parts shown in Figure 15 is substantially like that shown in Figures 7 and 8 and will be understood without further description.

Figure 12:
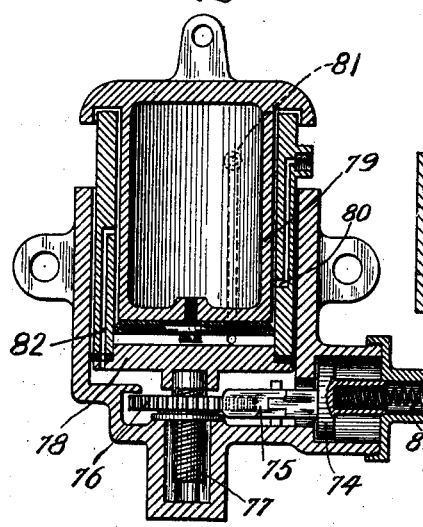
Figure 12 is a sectional view showing a compensating contrivance employed for overcoming any difficulty that may arise from permanent set in the springs or from any other cause which might interfere with the normal action of my automatic mechanism.
Figure 13:
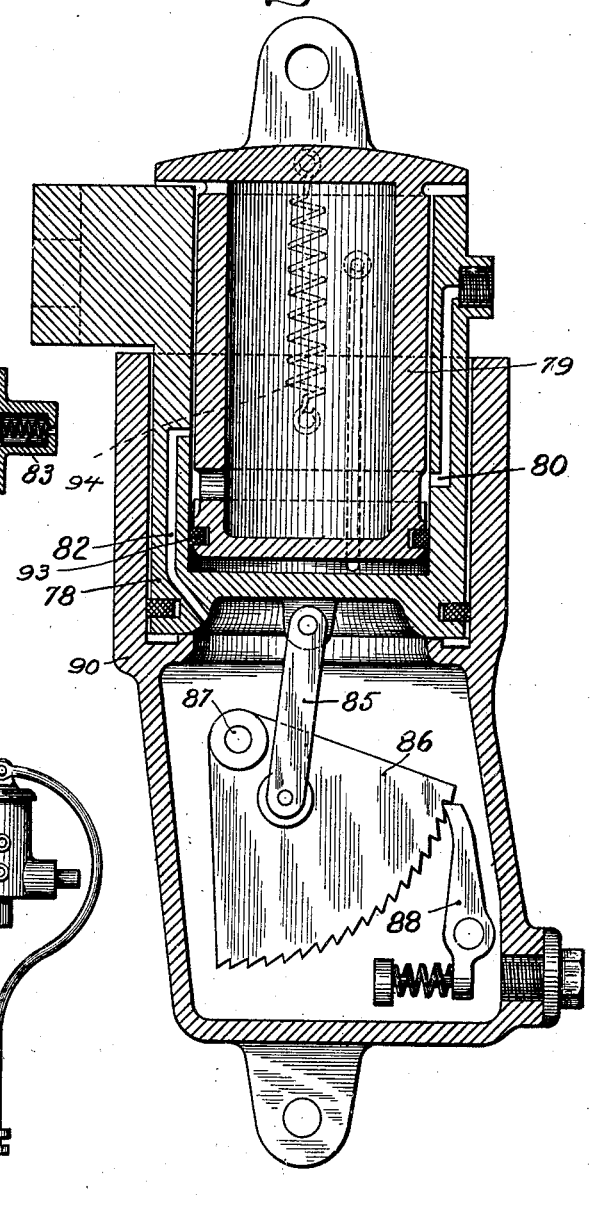
Figure 13 is a modified form for accomplishing the same purposes as are to be accomplished by the device of Figure 12.

Referring to Figures 12 and 13, it will be seen that I have therein shown some devices applied as supplemental to the controlling piston device 50 of the other views, for the purpose of compensating for any permanent set or other disturbing influence that may arise in connection with the spring support of the car or other parts of the mechanism. In order to understand the mechanism of Figures 12 and 13, it is first to be noted that in the arrangements of Figure 7 and of the other figures, if the controlling piston device 50 has too much motion due to permanent set of the springs, the load brake gear will be thrown into action inadvertently, that is when it is not desired. This will result in too heavy a force on the brake and sliding of wheels and other trouble. In order to maintain just the proper degree of travel of the piston on the controlling piston device, I therefore provide an automatic take up mechanism which will act to take up so much of the travel as may be due to permanent set in the springs or to other disturbing conditions, but not to take up the amount of travel necessary to bring the mechanism into operation when desired. In Figure 12 this take up mechanism is shown in the form of a piston 74 acting to move a pawl 75 which is engaged by a ratchet wheel 76 that turns on a screw 77 intended to lift on a movable cylinder 78 which in turn contains the controlling piston 79. This mechanism in substance simply raises the cylinder that contains the controlling piston 79, therefore the controlling piston 79 always has just the same amount of travel within its cylinder before it can open the port 80, which is the port from which the air passes to operate the change valve, the inlet to this mechanism being through the passage 81 indicated in dotted lines. An additional port or passage 82 is provided so that if the piston 79 exceeds the travel necessary to allow air to flow through the port opening 80 the air will then find an escape around through the passage 82 and acting against the left side of the piston 74 force it to the right against the spring 83 so that when the pressure is taken off from the the left side again the spring will move the piston back and partially rotate the ratchet wheel 76 and screw 77. This will move up the cylinder 78 so that the next time the device acts, it will have just the right amount of travel.

In Figure 13 I have shown another modification of the device shown in Figure 12 in which in place of the piston and horizontally rotating device at the bottom for lifting the cylinder 78 I have attached to the said cylinder 78 a link 85 which connects with a movable quadrant 86 pivoted at 87 and when the quadrant rises the teeth thereof engage with a pawl 88 in such a manner as to hold the cylinder to the extent that it has raised for any admission of air that may occur through the passage 82 which is disposed with reference to the passages 80 the same as in the case in the device of Figure 12.

When the outside cylinder 90 of Figure 13 moves down from admission of pressure through 82, (which it does because it has a larger area than the area of the controlling piston 79, the two being connected to operate in opposite directions on the lever mechanism) then the piston 79 is moved down through the action of the levers until 82 is opened to the atmosphere above the piston ring 93 which checks or limits the movement of the cylinder 90 to just the degree required. To hold the parts together a spring 94 is provided which is duplicated on opposite sides and connects the cylinders 79 and 90.

Having thus described my invention and illustrated its use, what I claim as new, and desire to secure by Letters Patent, is the following:

1. In an air brake apparatus the combination with a main brake cylinder, of an opposing cylinder and means for establishing communication between said cylinders when the car is light, and for closing such communication when the car is loaded, whereby the full force of the braking cylinder is available on a loaded car but not on a light car, substantially as described.

2. An air brake mechanism adapted to apply braking force in proportion to the load on the car comprising in combination a main cylinder, a differential opposing cylinder, and means for throwing the opposing cylinder in and out of operation.

3. An air brake device comprising in combination a main braking cylinder, an opposing mechanism designed to resist the force of the braking cylinder in a pre-determined ratio when the car is light, and means for throwing such opposing mechanism in and out of operation, substantially as described.

4. An air brake apparatus comprising in combination a main brake cylinder, an opposing cylinder, and an automatic change valve for governing the communication between said cylinders.

5. An air brake apparatus comprising in combination means for opposing the braking force of the main brake, and a controlling piston device actuated by the position of the beams of the car for controlling the opposing cylinder device, substantially as described.

6. An air brake apparatus comprising in combination a main brake cylinder and an opposing brake cylinder of a shorter travel than the main cylinder, and means for governing the action of the said opposing cylinder.

7. An air brake apparatus comprising in combination a load brake mechanism adapted to be fluid actuated, a train pipe, and a cut out valve controlling communication between said load brake apparatus and said train pipe when the pressure in the latter has reached a pre-determined point, substantially as described.

8. In an air brake apparatus the combination with a load brake device of a controlling piston mechanism mounted on each end of the car whereby the load brake cannot be operated until both ends of the car are loaded, substantially as described.

9. An air brake apparatus comprising in combination an opposing cylinder, a main brake cylinder, means on each end of the car for governing the action of the said opposing cylinder through the means of the change valve, substantially as described.

10. In an air brake apparatus the combination of a train pipe, a cut out valve, a change valve, and a differential piston device actuated by the position of the car body and of the springs thereof, substantially as described.

11. A load brake apparatus provided with means for opposing the braking mechanism, the combination with said means of means for automatically actuating the same comprising a controlling piston device operated by lever mechanism the movement whereof is determined by the compression of the car springs, substantially as described.

12. In an air brake apparatus the combination with means for opposing the braking mechanism, of means for automatically actuating the same comprising a controlling piston device operating against lever mechanism, and compensating gear for preventing inadvertent action of the controlling device.

13. In an air brake apparatus, the combination with braking means, means to oppose the braking means, and means whereby such last means is controlled by the car, substantially as described.

In testimony whereof I have hereunder signed my name in the presence of the two subscribed witnesses.

CLYDE C. FARMER.

Witnesses:
PAUL SYNNESTVEDT,
PAUL CARPENTER.